United States Patent [19]

Dezael et al.

[11] 4,421,725

[45] Dec. 20, 1983

[54] PROCESS FOR PURIFYING A GAS CONTAINING HYDROGEN SULFIDE AND CARBON DIOXIDE AND APPARATUS THEREFOR

[75] Inventors: Claude Dezael, Maisons Laffitte; Sigismond Franckowiak, Rueil Malmaison, both of France

[73] Assignee: Institut Francais du Petrole, Rueil-Malmaison, France

[21] Appl. No.: 281,798

[22] Filed: Jul. 9, 1981

[30] Foreign Application Priority Data

Jul. 9, 1980 [FR] France .............................. 80 15337

[51] Int. Cl.³ .............................................. B01D 53/34
[52] U.S. Cl. ........................................ 423/228; 423/210; 423/220; 423/229; 261/79 A; 261/79 R; 261/116; 261/126
[58] Field of Search ............... 423/210 R, 220, 228, 423/229; 261/79 R, 116, 126, 79 A

[56] References Cited

U.S. PATENT DOCUMENTS

| | | | |
|---|---|---|---|
| 2,519,618 | 7/1947 | Wilson | 261/79 A |
| 3,345,046 | 10/1967 | Versluys et al. | 261/79 A |
| 3,605,388 | 7/1968 | Zuiderweg et al. | 261/79 A |
| 4,085,192 | 4/1978 | Van Scoy | 423/573 R |
| 4,093,701 | 6/1978 | Butwell | 423/228 |

*Primary Examiner*—Edward J. Meros
*Assistant Examiner*—Jackson Leeds
*Attorney, Agent, or Firm*—Millen & White

[57] ABSTRACT

Process for separating $H_2S$ from $CO_2$, both contained in a treated gas, wherein said gas is contacted with a solution which selectively absorbs $H_2S$, wherefrom $H_2S$ is separated in a regeneration zone, $CO_2$ being released, said contact step being effected in a contact apparatus comprising 1 to 10 stages each formed of parallel vertical tubes whose bottom portion is provided with injection means of the cyclonic type imparting to the supplied gas and liquid a swirling ascending motion.

7 Claims, 8 Drawing Figures

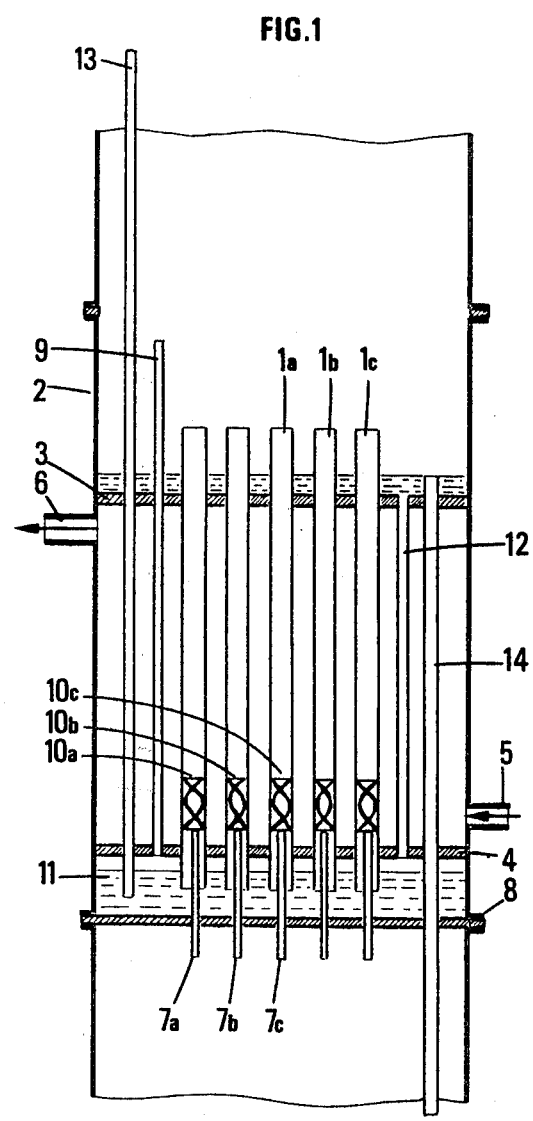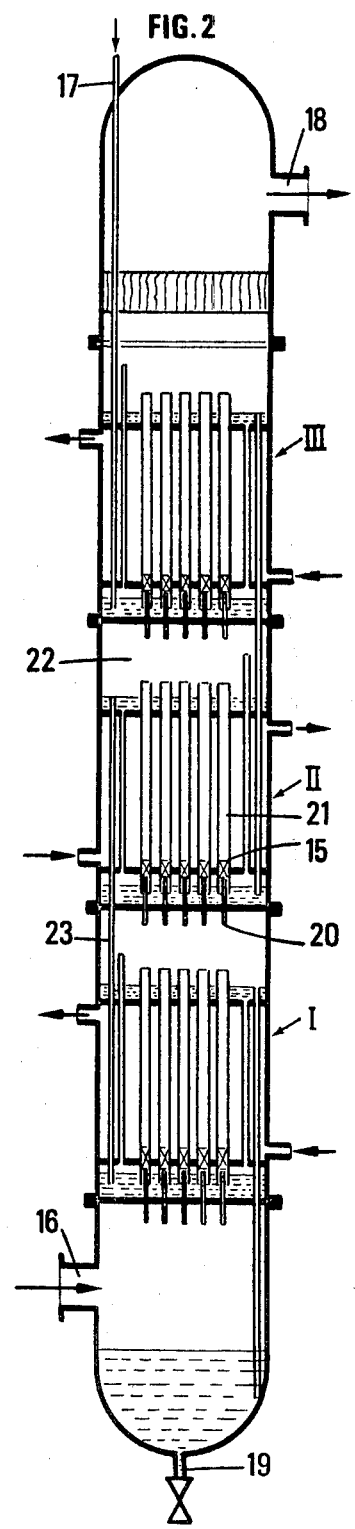

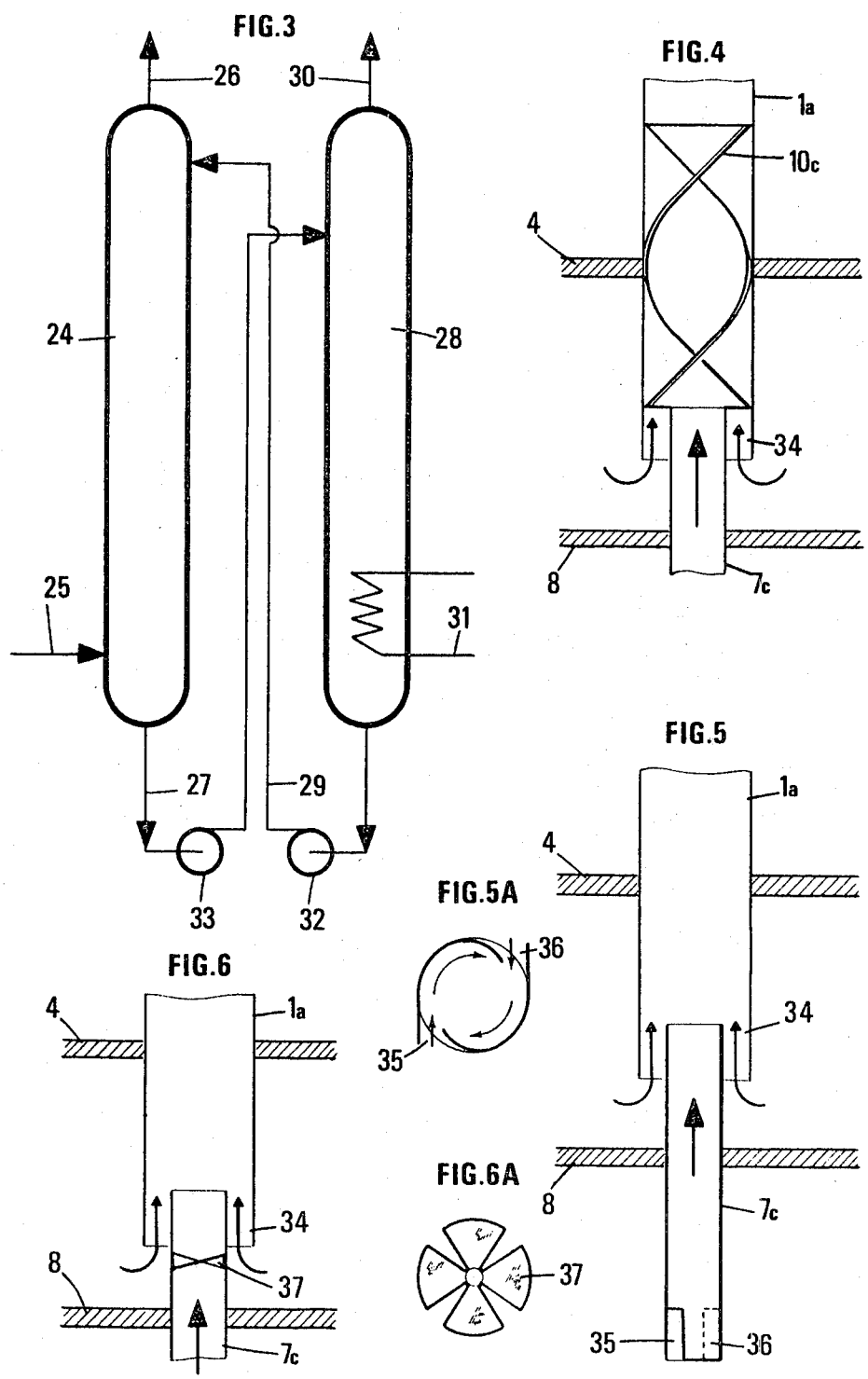

PROCESS FOR PURIFYING A GAS CONTAINING HYDROGEN SULFIDE AND CARBON DIOXIDE AND APPARATUS THEREFOR

This invention concerns an improved process for removing hydrogen sulfide from a gas containing it together with carbon dioxide, as well as an apparatus therefor.

Processes for removing hydrogen sulfide from gaseous mixtures containing simultaneously hydrogen sulfide and carbon dioxide are already known. They generally take advantage of the difference in the absorption rate between $H_2S$ and $CO_2$ is absorbing solutions capable of absorbing $H_2S$ more quickly than $CO_2$, the selectivity for $H_2S$ being greatly improved by an increase in the gas velocity and/or the number of contact stages of the apparatus.

The apparatuses generally used are plate columns of the bubble cap or the flap valve type, wherein the liquid and gas flow rates have been increased, thereby decreasing the contact time between gas and liquid.

This type of apparatus, which provides for a certain selectivity, has however limits which are due to the fact that, whereas the gas velocity may be high at the level of the holes of the plate, the average ascending rate of a gas bubble in the liquid remains low, of the order of 20 cm per second, to that the gas-liquid contact time is relatively high.

The present process avoids these disadvantages. It consists, in a first stage, of treating the gas containing $H_2S$ and $CO_2$ with an absorbing solution in a specially adapted apparatus, wherein a very short contact time is possible in all the gas-liquid contact zone and the separation of the gas from the liquid is very rapid, so as to selectively absorb $H_2S$ in the solution and produce a gas of lower $H_2S$ content, enriched with $CO_2$ and then, in a second step, of regenerating the absorbing solution for its re-use.

The apparatus used in the absorption stage may comprise one or several stages, for example 1 to 10 and, more particularly, 2 to 4 stages.

BRIEF DESCRIPTION OF DRAWINGS

FIG. 1 is an elevational view of a single stage of a column in one embodiment of the apparatus.

FIG. 2 is an elevational view of an entire column employing three stages.

FIG. 3 is a schematic flow sheet illustrating the overall process using an absorption column and a regenerating column.

FIGS. 4, 5 and 6 are elevational views of various embodiments of injection devices designed to impart a rotary movement to incoming fluid.

FIG. 5A is a cross-sectional view of FIG. 5.

FIG. 6A is a plan view of blades used in FIG. 6.

DETAILED DESCRIPTION OF DRAWINGS

Each stage (shown by way of example on FIG. 1) is formed of a series of parallel tubes such as 1a, 1b, 1c, arranged in a jacket (2) and maintained by two supporting plates (3) and (4) in the same manner as in a heat exchanger. The tubes are provided inside their lower portion with such a device as 10a, 10b, 10c imparting rotary movement, in the tube, to the gas and the liquid introduced therein. This device preferably comprises a stationary part, for example of metal or plastic material, comprising helical grooves imparting a swirling motion to the gas or liquid circulating at a sufficient velocity. In a particular embodiment, the motion may be generated by tangential orifices located at the bottom part of the main tubes.

This device generates, by cyclone effect, a very efficient gas-liquid contact, a high turbulence of the gas, simultaneously with a very efficient gas-liquid separation. Each tube is fed with gas through a tube of smaller diameter (such as 7a, 7b, 7c) than the diameter of the main tube (1a, 1b, 1c); the assembly of the feeding tubes is maintained in position by means of a supporting plate (8). A duct for feeding with absorption liquid (13) opens in the lower portion (11) where a liquid level is formed, and a discharge duct (14) for the absorption liquid enables the liquid circulation through the stage. One or more pipes (12), placed between the upper portion and the lower portion, provide for an internal recirculation of the absorption liquid. A pipe (9) provides for the balancing of the pressure inside one stage. Two inlet and outlet pipes, 5 and 6, provide for the circulation, in the portion between the supporting plates 3 and 4, of a fluid used to maintain the desired temperature in the gas-liquid contact zone.

The gas-liquid contact in such a stage is effected co-currently in the tubes of mixture whereas the stage itself is fed with counter-currently circulating gas and liquid (pipes 7 supplying the gas phase, pipe 13 supplying the liquid phase).

The serial arrangement of the stages forming one absorption column is shown on FIG. 2. For sake of simplicity, only three stages are shown but the number of stages is not limited.

The treated gas is introduced at the lower portion of the absorption column through pipe 16 and flows into element I whereas the absorbing solution is introduced at the upper portion of said column through pipe 17 and feeds element III. The treated gas, issued from element III, escapes from the installation through pipe 18 and the absorbing solution flowing from element I is recovered, at the bottom of the column, through pipe 19. There is thus effected an overall gas-liquid counter-current circulation.

In each element (II for example), the treated gas flows through tubes such as 20 into tubes such as 21 while drawing in the absorbing solution in which are dipped the bottom parts of the tubes and which issues from the next element III. The fluid mixture is driven at high speed by the cyclone effect generated by device 15 when passing therethrough and reaches the free portion 22 where the gas which then feeds the next element III is separated from the solution which flows by gravity, through pipe 23, into the adjacent element I.

There is thus effected, as far as one stage is concerned, a co-current gas-liquid circulation during which the contact between the gas and the liquid takes place only inside the tubes 21 and is, consequently, extremely short.

The diameter of these tubes, arranged in bundle, may vary, according to the installations, from 8 to 100 mm and their length is generally from 5 to 100 times their diameter. With such sizes, the velocity of the gas carrying along the liquid through these tubes is from 3 to 30 meters per second.

During the first stage of the process of the invention (absorption stage), the gas to be treated, containing $H_2S$ and $CO_2$, is contacted, in the described apparatus, with an aqueous solution containing an agent capable of selectively absorbing $H_2S$, so as to produce a gas substantially free of $H_2S$ and an aqueous solution which, in a second stage (regeneration stage) is treated in a known manner to remove $H_2S$ and $CO_2$ contained therein, in order to be re-used in the first stage.

All the solvents commonly used for absorbing $H_2S$ in the presence of $CO_2$ are convenient according to the invention; however, the absorbing solution as presently used, is preferably an aqueous solution of a tertiary alkanolamine, for example methyldiethanolamine or diethylethanolamine, at a preferred concentration from 0.5 to 6 moles of amine per liter of solution.

In this first stage, the temperature is maintained, in the regions surrounding the external portions of the gas-liquid contact zone, at 10° to 60° C., by circulation of a fluid such as water for example, whereby the heat excess generated by the absorption reaction of $H_2S$ in alkanolamine can be removed.

The operating pressure of the installation are usually from 1 to 50 absolute atmospheres and, preferably, from 1 to 20 absolute atmospheres.

There is obtained, as product of said stage, a gas substantially free of $H_2S$ which is discharged from the installation and an aqueous alkanolamine solution, containing $H_2S$, which is subsequently treated in a second stage (regeneration stage) by known means for regenerating it. It is subjected, for example, to heating and/or stripping so as to obtain the release of a gas effluent of high $H_2S$ and low $CO_2$ contents and to recover the alkanolamine aqueous solution which is fed back to the absorption stage.

FIG. 3 diagrammatically illustrates the operation of the installation. The gas to be treated is fed at the lower portion of the absorption column 24 through line 25 wherefrom it escapes, after treatment, at the top, through line 26, while the absorbing solution, containing $H_2S$, is discharged from the bottom through line 27 wherefrom it is introduced at the upper portion of column 28 (second stage). The regenerated absorbing solution is recovered at the bottom of column 28, through line 29, and is fed to the upper portion of column 24, whereas the gas of high $H_2S$ content escapes through line 30.

A heating installation 31 and pumps 32 and 33 are shown on the diagram but all the other ancillary elements necessary for the operation are not shown.

FIGS. 4, 5 and 6 show in detail different embodiments of the device for driving the gas and/or liquid in rotation. On FIG. 4 this device (10c) is shown as a continuous elongate stationary helix; the gas enters through central duct 7c and draws in the liquid in annular space 34, in the direction of the arrows.

The device of FIG. 5 is characterized by the particular shape of the inlet of duct 7c. The gas enters tangentially through openings such as 35 and 36 which generate an ascending cyclonic motion of this gas through tube 7c. This motion is transmitted, in tube 1a, to the liquid flowing through the annular space 34. FIG. 5a shows a cross-section of tube 7c at the level of openings 35 and 36.

In the device of FIG. 6, the cyclonic motion is imparted to the gas by blades inclined to the horizontal (37). FIG. 6A is a plan view of these blades.

The installation may be designed with one or more absorption columns and one or more regeneration columns, according to each case.

The advantage of the invention will be better understood from the following comparative examples.

EXAMPLE 1

(Comparison)

In a plate column of 20 cm diameter and 3 meters height, comprising 3 stages, there is treated a gas having the following composition: $N_2=5.7\%$, $CO_2=88.4\%$, $H_2S=5.9\%$, introduced at a rate of 25 Nm3/h, with a stream of an aqueous solution of methyldiethanolamine 2 M flowing at a rate of 90 liters per hour. At the top of the column, there is obtained a gas having the following composition: $N_2=6.4\%$, $CO_2=92.52\%$, $H_2S=1.07\%$ and, at the bottom of the column, a solution which is fed back to the regeneration stage, wherefrom there is released, at a rate of 2741 liters per hour, a gas containing 54.9% of $CO_2$ and 45.10% of $H_2S$.

The absorption rates, calculated from the input gas and the gases produced at the regeneration stage, are respectively 83.8% for $H_2S$ and 6.81% for $CO_2$.

EXAMPLE 2

(Invention)

The operation is effected in a column comprising 3 absorption stages, conforming with FIG. 2; in particular each stage comprises 5 tubes of 20 mm diameter and 30 cm length, each tube having at its bottom portion a system for imparting rotary movement to the gas and the liquid, the diameter of the column is about 20 cm and its height 2 meters. In this column, a gas having the same composition as that of example 1, fed at a rate of 25 Nm$^3$/h, is treated with an aqueous solution of methyldiethanolamine 2 M fed at a rate of 90 l/h.

At the top of the column there is obtained a gas having the following composition:

$N_2=6.21\%$, $CO_2=93.59\%$, $H_2S=0.196\%$ and a liquid which is fed back to the regeneration stage, wherefrom is released a gas, at a rate of 2070 l/h, whose composition is:

$H_2S=69\%$ and $CO_2=31\%$.

The absorption rates are respectively 97% for $H_2S$ and 2.9% for $CO_2$.

The comparison of the results obtained in these two examples show that a substantially higher degree of purification is achieved by using the technique according to the invention, whereas the coabsorption of $CO_2$ is about one half.

What is claimed is:

1. In a process for the selective separation of hydrogen sulfide from a gas mixture containing hydrogen sulfide and carbon dioxide, wherein, in an absorption zone, the gas to be treated is contacted with an aqueous solution of an absorbing agent selective for hydrogen sulfide, said absorbing agent being a tertiary alkanolamine in a concentration of 0.5 to 6 moles per liter, so as to separate a gas substantially free of hydrogen sulfide and containing the most part of the carbon dioxide and a solution of high hydrogen sulfide content which is fed to a regeneration zone where a gas of high $H_2S$ content and low $CO_2$ content is separated to form a regenerated solution which is recycled to the first stage, the improvement comprising conducting the absorption stage in a contact apparatus comprising from 1 to 10 stages, each stage being formed of parallel tubes wherein the gas and the liquid flow co-currently with a swirling motion generated by injection means of the cyclonic type, with a gas velocity from 3 to 30 meters per second, said parallel tubes having a diameter from 8 to 100 mm and a length from 5 to 100 times their diameter.

2. A process according to claim 1, wherein the absorbing agent is methyldiethanolamine or diethylethanolamine.

3. A process according to claim 1, wherein the gas in the tube draws in said liquid for co-current contact.

4. A process according to claim 1, wherein the swirling movement is generated by admitting the gas tangentially into said parallel tubes.

5. A process according to claim 1, further comprising removing the heat generated by the absorption reaction in the first stage to maintain external parts of the first stage contact apparatus at 10° to 60° C.

6. A process according to claim 1, wherein the absorption stage is effected under a pressure from 1 to 50 absolute atmospheres.

7. A process according to claim 1, wherein the contact apparatus comprises 2 to 10 stages wherethrough overall the gas and liquid flow counter-currently.

* * * * *